(12) United States Patent
Oba (10) Patent No.: US 9,770,971 B1
(45) Date of Patent: Sep. 26, 2017

(54) DRIVE UNIT

(71) Applicant: Toyota Jidosha Kabushiki Kaisha, Toyota-shi Aichi-ken (JP)

(72) Inventor: Hidehiro Oba, Nagakute (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 0 days.

(21) Appl. No.: 15/497,639

(22) Filed: Apr. 26, 2017

(30) Foreign Application Priority Data

Apr. 28, 2016 (JP) ................. 2016-091019

(51) Int. Cl.
| | |
|---|---|
| *B60K 6/44* | (2007.10) |
| *B60K 6/442* | (2007.10) |
| *B60K 6/365* | (2007.10) |
| *F16H 3/72* | (2006.01) |
| *F16H 61/30* | (2006.01) |
| *B60K 6/387* | (2007.10) |

(52) U.S. Cl.
CPC .............. *B60K 6/442* (2013.01); *B60K 6/365* (2013.01); *B60K 6/387* (2013.01); *F16H 3/724* (2013.01); *F16H 61/30* (2013.01); *B60Y 2200/92* (2013.01); *B60Y 2400/73* (2013.01); *F16H 2200/2007* (2013.01); *F16H 2200/2038* (2013.01); *Y10S 903/911* (2013.01)

(58) Field of Classification Search
CPC ................................ B60K 6/442; F16H 3/724
See application file for complete search history.

(56) References Cited

U.S. PATENT DOCUMENTS

| | | | | |
|---|---|---|---|---|
| 9,481,235 | B1* | 11/2016 | Banshoya | ............... F16H 3/728 |
| 2013/0217538 | A1* | 8/2013 | Martin | .................. B60W 20/40 |
| | | | | 477/5 |
| 2015/0072819 | A1* | 3/2015 | Ono | ...................... B60K 6/365 |
| | | | | 475/5 |
| 2016/0236671 | A1* | 8/2016 | Imamura | ............... B60W 20/14 |
| 2016/0368361 | A1* | 12/2016 | Endo | ..................... B60K 6/442 |
| 2017/0008510 | A1* | 1/2017 | Imamura | ............... B60K 6/445 |
| 2017/0043759 | A1* | 2/2017 | Shibata | .................. B60K 6/383 |
| 2017/0096058 | A1* | 4/2017 | Kanada | .................. B60K 6/365 |
| 2017/0097055 | A1* | 4/2017 | Shibata | ................... F16D 48/06 |

FOREIGN PATENT DOCUMENTS

JP 2006-077857 A 3/2006

* cited by examiner

*Primary Examiner* — Derek D Knight
(74) *Attorney, Agent, or Firm* — Dinsmore & Shohl LLP (57) ABSTRACT

A first ring gear of a drive unit is connected to a second carrier and is mechanically connected to a counter shaft. A first sun gear is connected to a second sun gear and a first rotary electric machine. A first clutch selectively switches between a connection state and a disconnection state of the first sun gear and an engine. A second clutch selectively switches between a connection state and a disconnection state of a first carrier and the engine. A brake selectively switches between a fixed state and a release state of a second ring gear to and from a fixing member.

6 Claims, 6 Drawing Sheets

EV TRAVEL MODE (MG2 SINGLE DRIVE)

FIG. 4

EV TRAVEL MODE (DUAL DRIVING)

FIG. 5

SERIES TRAVEL MODE

FIG. 6

SERIES-PARALLEL TRAVEL MODE

FIG. 7

PARALLEL TRAVEL MODE (FIRST SPEED)

FIG. 8

PARALLEL TRAVEL MODE (SECOND SPEED)

FIG. 9

PARALLEL TRAVEL MODE (THIRD SPEED)

FIG. 10

PARALLEL TRAVEL MODE (FOURTH SPEED)

DRIVE UNIT

CROSS-REFERENCE TO RELATED APPLICATIONS

This application claims priority to Japanese Patent Application No. 2016-091019 filed on Apr. 28, 2016 which is incorporated herein by reference in its entirety including the specification, drawings and abstract.

BACKGROUND

1. Technical Field

The present disclosure relates to a drive unit.

2. Description of Related Art

Various proposals have conventionally been made for a drive unit of a vehicle including a rotary electric machine, an engine, and a planetary gear drive.

For example, the drive unit disclosed in Japanese Patent Application Publication No. 2006-77857 includes an engine, a first rotary electric machine, a second rotary electric machine, a first planetary gear drive, a second planetary gear drive, a third planetary gear drive, a plurality of clutches, and a brake.

In the drive unit, a plurality of travel modes can be set by switching the clutches and the brake.

SUMMARY

However, when a high driving force is requested, the drive unit disclosed in JP2006-77857A is unable to generate maximum driving force through effective use of all the motive power of two rotary electric machines and the engine.

The present disclosure relates to a drive unit in which a plurality of travel modes can be selected, the drive unit having a mechanism capable of generating maximum driving force with use of all the motive power of two rotary electric machines and the engine, when a high driving force is requested.

An example aspect of the present disclosure is a drive unit. The drive unit includes a driving shaft connected to driving wheels, an engine, a first rotary electric machine, a second rotary electric machine mechanically connected to the driving shaft, a first planetary gear drive including a first ring gear, a first pinion gear, a first carrier connected to the first pinion gear, and a first sun gear, a second planetary gear drive including a second ring gear, a second pinion gear, a second carrier connected to the second pinion gear, and a second sun gear, a first clutch, a second clutch and a brake.

The first ring gear is connected to the second carrier, the first ring gear is mechanically connected to the driving shaft, the first sun gear being connected to the second sun gear and the first rotary electric machine, the first clutch is configured to selectively switch a connection state of the first sun gear and the engine between a connected state and a disconnected state, the second clutch being configured to selectively switch a connection state of the first carrier and the engine between a connected state and a disconnected state, and the brake being configured to selectively switch a fixation state of the second ring gear and a fixing member between a fixed state and a released state.

The aforementioned drive unit can generate a high driving force using the motive power of the two rotary electric machines and the engine, when the high driving force is requested.

The drive unit in which a plurality of travel modes can be selected can generate the high driving force by combining the motive power of the two rotary electric machines and the engine.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

With reference to FIGS. 1 to 10, a vehicle 1 and a drive unit according to the present embodiment will be described. In FIGS. 1 to 10, identical or substantially identical component members are designated by identical reference signs, and a redundant description thereof may be omitted.

Figure 1:
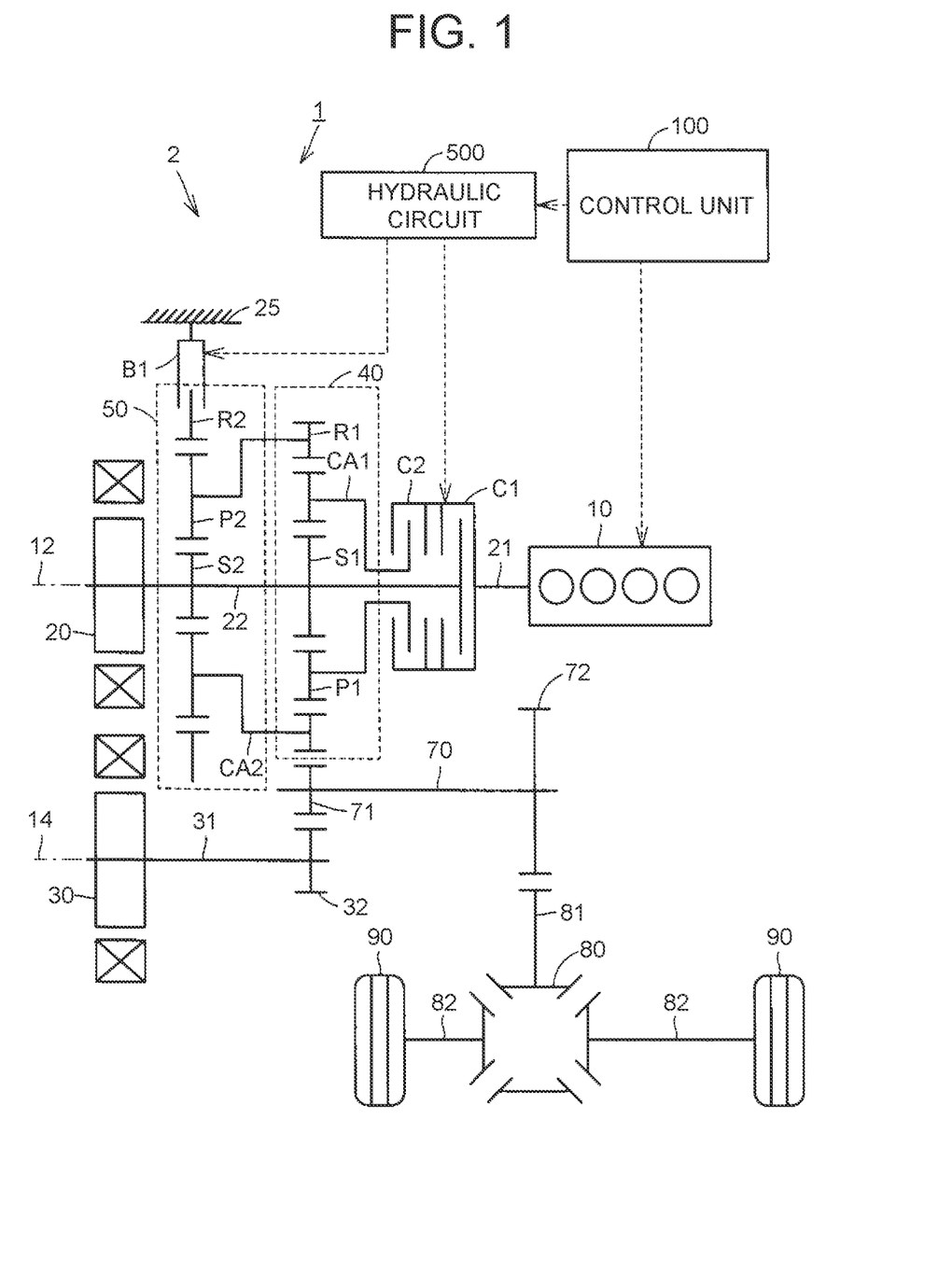
FIG. 1 is a schematic view illustrating the overall configuration of a vehicle according to the present embodiment.

FIG. 1 is a schematic view illustrating the overall configuration of the vehicle 1 according to the present embodiment. The vehicle 1 includes a drive unit 2, driving wheels 90, a control unit 100, and a hydraulic circuit 500. The drive unit 2 includes an engine 10, a first MG (first rotary electric machine) 20, a second MG (second rotary electric machine) 30, a transmission unit constituted of a first planetary gear drive 40 and a second planetary gear drive 50, a clutch (first clutch) C1, a clutch (second clutch) C2, and a brake B1.

The vehicle 1 travels with the motive power of at least one of the engine 10, the first MG 20, and the second MG 30. The vehicle 1 may be a plug-in hybrid that is chargeable from an external power supply.

The drive unit 2 according to the present embodiment can operate in so-called an EV travel mode, a series travel mode, a series-parallel travel mode, and a parallel travel mode by controlling an engagement state of the clutch C1, the clutch C2, and the brake B1 and driving of the first MG1, the second MG2, and the engine 10.

The engine 10 is an internal combustion engine, such as a gasoline engine and a diesel engine, for example.

The first MG 20 and the second MG 30 each include a stator and a rotor provided rotatably with respect to the stator. The rotor has a permanent magnet embedded therein. The rotor of the first MG 20 is fixed to a rotating shaft 22. The rotor of the second MG 30 is fixed to a rotating shaft 31. The rotating shaft 22 is disposed on a first shaft 12, while the rotating shaft 31 is disposed on a second shaft 14 parallel to the first shaft 12.

On the first shaft 12, the first MG 20, the second planetary gear drive 50, the first planetary gear drive 40, the clutch C2, the clutch C1, and the engine 10 are disposed in sequence.

The second planetary gear drive 50 includes a sun gear S2, a plurality of pinion gears P2, a carrier CA2 that connects each of the pinion gears P2, and a ring gear R2. The second planetary gear drive 50 is a single planetary gear.

The sun gear S2 is fixed to the rotating shaft 22. The ring gear R2 is provided on an outer peripheral side of the sun gear S2, with the center of rotation being coaxial with the first shaft 12. The carrier CA2 is provided rotatably around the first shaft 12. The carrier CA2 supports each pinion gear P2 in a rotatable manner. Each pinion gear P2 is disposed between the sun gear S2 and the ring gear R2. The pinion gears P2 are provided so as to be able to revolve around the sun gear S2 and to rotate around the central axis of the pinion gear P1.

The rotational speed of the sun gear S2, the rotational speed of the carrier CA2, and the rotational speed of the ring gear R2 are in a relationship (relationship wherein when two rotational speeds out of the rotational speeds of the sun gear S2, the carrier CA2, and the ring gear R2 are determined, the rotational speed of the remaining component are also determined) connected with a straight line in a later-described alignment chart.

The brake B1 is provided in a casing 25 on an outer peripheral side of the ring gear R2. The brake B1 is a hydraulic friction engagement element that can restrict rotation of the ring gear R2. When the brake B1 is in an engagement state, the sun gear S2 is fixed to the casing 25, which restricts the rotation of the ring gear R2. When the brake B1 is in a disengagement state, the rotation of the ring gear R2 is permitted.

The first planetary gear drive 40 includes a sun gear S1, a plurality of pinion gears P1, a carrier CA1 that connects each of the pinion gears P1, and a ring gear R1. The first planetary gear drive 40 is a single planetary gear.

The sun gear S1, which is fixed to the rotating shaft 22, is provided rotatably around the first shaft 12. Accordingly, the rotating shaft 22, the sun gear S1, and the sun gear S2 integrally rotate. The ring gear R1 is provided on an outer peripheral side of the sun gear S1. The ring gear R1 is provided rotatably around the first shaft 12.

The ring gear R1 is disposed on an outer peripheral side of the sun gear S1. The ring gear R1 is provided rotatably around the first shaft 12. The ring gear R1 is connected to the carrier CA2, so that the ring gear R1 and the carrier CA2 integrally rotate.

Each of the pinion gears P1 is disposed between the sun gear S1 and the ring gear R1 so as to gear with the sun gear S1 and the ring gear R1.

The pinion gears P1 are provided so as to be able to revolve around the sun gear S1 and to rotate around the center of rotation of the pinion gears P1.

The carrier CA1, which rotatably supports each pinion gear P1, is provided rotatably around the first shaft 12.

The rotational speed of the sun gear S1, the rotational speed of the carrier CA1, and the rotational speed of the ring gear R1 are in a relationship (relationship wherein when two rotational speeds out of the rotational speeds of the sun gear S1, the carrier CA1, and the ring gear R1 are determined, the rotational speed of the remaining component is also determined) connected with a straight line in an alignment chart as described later.

The clutch C2 is a hydraulic friction engagement element that can couple the crankshaft 21 and the carrier CA1. When the clutch C2 is in an engagement state, the crankshaft 21 and the carrier CA1 are coupled and rotate integrally with each other. When the clutch C2 is disengaged, the carrier CA1 is released from the coupled state with the crankshaft 21.

The clutch C1 is provided on a power transmission line from the engine 10 to the first MG 20. The clutch C1 is a hydraulic friction engagement element that can couple the rotating shaft 22, the sun gear S1, and the sun gear S2 with the crankshaft 21 of the engine 10. When the clutch C1 is in an engagement state, the rotating shaft 22, the sun gear S1, the sun gear S2, and the crankshaft 21 are coupled, so that the motive power of the engine 10 can directly be transmitted to the first MG1.

When the clutch C1 is disengaged, the crankshaft 21 of the engine 10 is released from the coupled state with the rotating shaft 22, the sun gear S1, and the sun gear S2. As a result, it becomes impossible to directly transmit the motive power from the engine 10 to the first MG1.

The ring gear R1 has outer peripheral teeth formed on the outer periphery thereof. The outer peripheral teeth gear with a driven gear 71. The driven gear 71 is fixed to one end of a counter shaft 70. The counter shaft 70 is disposed so as to be parallel to the first shaft 12 and the second shaft 14. The other end of the counter shaft 70 is provided with a drive gear 72. The drive gear 72 gears with a differential ring gear 81 of a differential gear 80. The differential gear 80 is connected to a driving shaft 82, and the driving shaft 82 is connected to the driving wheels 90. Accordingly, rotation of the counter shaft 70 is transmitted to the driving wheels 90 through the differential gear 80.

As a result, the motive power from the engine 10 and the first MG 20 is transmitted through the first planetary gear drive 40, the second planetary gear drive 50, and the driven gear 71 to the counter shaft 70.

The rotating shaft 31 of the second MG 30 is fixed to a reduction gear 32. The reduction gear 32 gears with the driven gear 71. Accordingly, the motive power from the second MG 30 is transmitted to the counter shaft 70 through the reduction gear 32.

Figure 2:
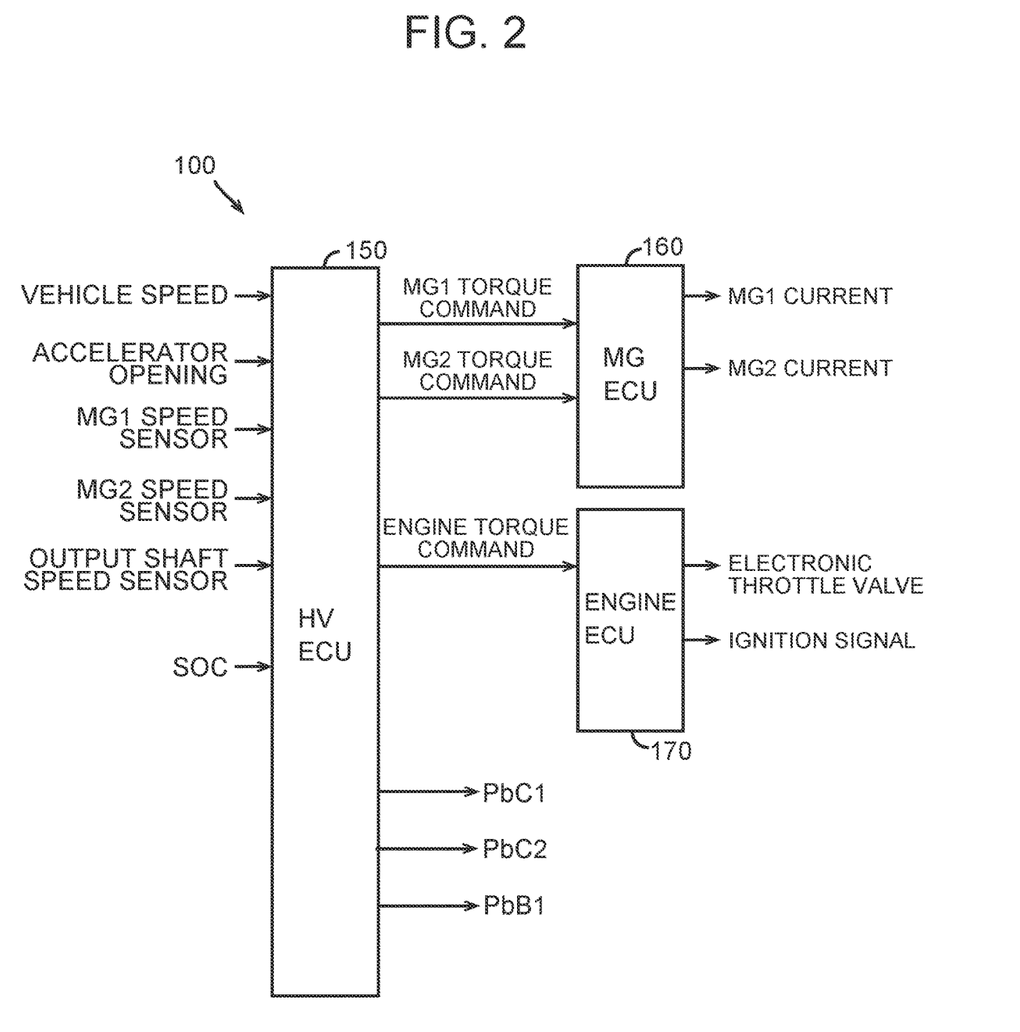
FIG. 2 is a block diagram illustrating the configuration of a control unit illustrated in FIG. 1.

FIG. 2 is a block diagram illustrating the configuration of the control unit 100 illustrated in FIG. 1. The control unit 100 includes an HV electric control unit (ECU) 150, an MGECU 160, and an engine ECU 170. The HVECU 150, the MGECU 160, and the engine ECU 170 are each an electronic control unit configured to include a computer. The number of ECUs is not limited to three. All the ECUs may be integrated into one ECU, or one ECU may be divided into two, or four or more ECUs.

The MGECU 160 controls the first MG 20 and the second MG 30. For example, the MGECU 160 regulates a current value supplied to the first MG 20 so as to control output torque of the first MG 20. The MGECU 160 also regulates a current value supplied to the second MG 30 so as to control output torque of the second MG 30.

The engine ECU 170 controls the engine 10. For example, the engine ECU 170 performs control, such as control of the opening of an electronic throttle valve of the engine 10, ignition control of the engine by outputting an ignition signal, and fuel injection control for the engine 10. The engine ECU 170 controls the output torque of the engine 10 by such operation as control of the opening of the electronic throttle valve, injection control, and ignition control.

The HVECU 150 performs comprehensive control of the entire vehicle. The HVECU 150 is connected to sensors such as a vehicle speed sensor, an accelerator opening sensor, an MG1 speed sensor, a MG2 speed sensor, an output shaft speed sensor, and a battery sensor. With these sensors, the HVECU 150 acquires values such as a vehicle speed, an accelerator opening, the speed (rotational speed) of the first MG 20, the speed (rotational speed) of the second MG 30, the speed (rotational speed) of the output shaft of a transmission gear, and a battery state SOC.

The HVECU 150 calculates request values such as driving force, power, and torque requested to the vehicle, based on the acquired information. The HVECU 150 determines an output torque of the first MG 20, an output torque of the second MG 30, and an output torque of the engine 10 based on the calculated request values. The HVECU 150 outputs a command value of the MG1 torque and a command value of the MG2 torque to the MGECU 160. The HVECU 150 outputs a command value of the engine torque to the engine ECU 170.

The HVECU 150 controls the clutches C1, C2 and the brake B1 based on later-described travel modes or the like. The HVECU 150 outputs to the hydraulic circuit 500 in FIG. 1 command values (PbC1, PbC2) of the hydraulic pressure supplied to the clutches C1, C2 and a command value (PbB1) of the hydraulic pressure supplied to the brake B1, respectively.

Next, the details of control modes of the vehicle 1 will be described with reference to a differential engagement table and alignment charts.

TABLE 1

|  |  | C1 | C2 | B1 | MG 1 electric lock |
|---|---|---|---|---|---|
| EV travel mode |  | MG2 single travel mode | O |  |  |
|  |  | Dual-motor travel mode |  |  | O |
| HV travel mode | Series |  | O |  |  |
|  | Series-parallel |  |  | O |  |
|  | Parallel | Gear stage 1 | O |  | O |
|  |  | Gear stage 2 |  | O | O |
|  |  | Gear stage 3 | O | O |  |
|  |  | Gear stage 4 |  | O |  | O |

The table 1 illustrates each travel mode and the control states of the clutch C1 and the clutch C2 of the first planetary gear drive 40 and the brake B1 in each of the travel modes.

The control unit 100 controls the vehicle 1 to travel in "a motor travel mode (hereinafter referred to as an EV travel mode)" or "a hybrid travel mode (hereinafter referred to as an HV travel mode)."

The EV travel mode is the mode of driving the vehicle 1 with the motive power of at least one of the first MG 20 and the second MG 30, with the engine 10 being stopped. The HV travel mode is the mode of driving the vehicle 1 with the motive power of the engine 10 and the second MG 30 or the motive power of the engine 10, the first MG 20 and the second MG 30. In the present embodiment, the HV travel mode includes a series mode, a series-parallel mode, and a parallel mode.

In Table 1, "C1", "C2", "B1", "MG1", and "MG2" represent the clutch C1, the clutch C2, the brake B1, the first MG 20, and the second MG 30, respectively. A circle mark (O) in each column of C1, C2 and B1 represents "engagement", and no circle mark represents "disengagement."

In the EV travel mode, the control unit 100 selectively switches, corresponding to a request torque and the like of the user, between "MG2 single-travel mode" that drives the vehicle 1 with the motive power of only the second MG 30, and "dual-motor travel mode" that drives the vehicle 1 with the motive power of both the first MG 20 and the second MG 30. For example, when the load of the drive unit 2 is a low load, the single-travel mode is selected. When the load is a high load, the dual-motor travel mode is selected.

The HV travel mode is selected when the request torque requested from the user is not satisfied by the first MG 20 and the second MG 30, or when the total fuel efficiency is determined to be better when the HV travel mode is selected than when the EV travel mode is selected.

In the HV travel mode, any one of the series travel mode, the series-parallel travel mode, and the parallel travel mode is selected.

In the series travel mode, all the motive power of the engine 10 is used as the motive power for generating electric power in the first MG 20. The second MG 30 drives the driving wheels 90 using the electric power generated in the first MG 20.

In the series-parallel travel mode, some of the motive power of the engine 10 is used to drive the driving wheels 90, while the remaining motive power is used as the motive power for generating electric power in the first MG 20. The second MG 30 drives the driving wheels 90 using the electric power generated in the first MG 20.

In the series-parallel travel mode, the parallel travel mode is selected when the request torque from the user cannot be provided.

In the parallel travel mode, the driving wheels 90 are driven with the motive power from the first MG 20, the second MG 30, and the engine 10. In the present embodiment, four stages can be configured as shift stages.

Figure 3:
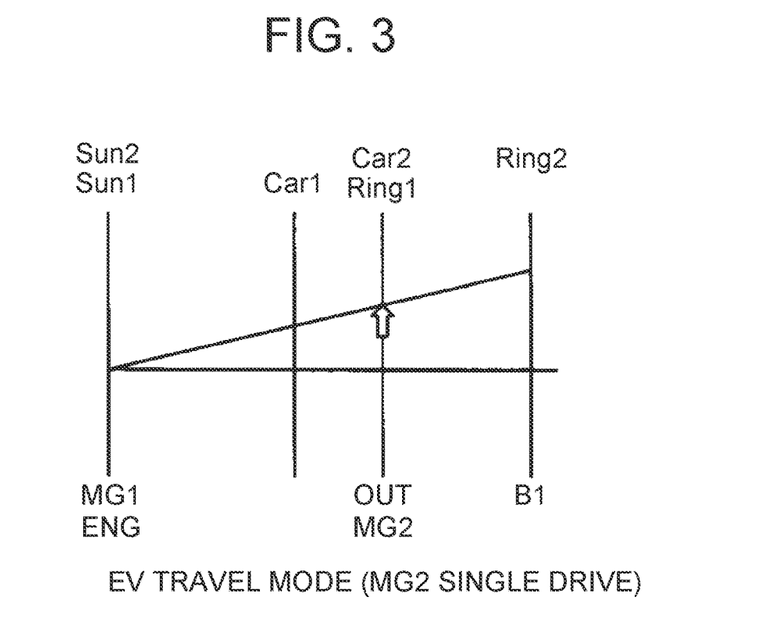
FIG. 3 is an alignment chart in an MG2 single travel mode.
Figure 4:
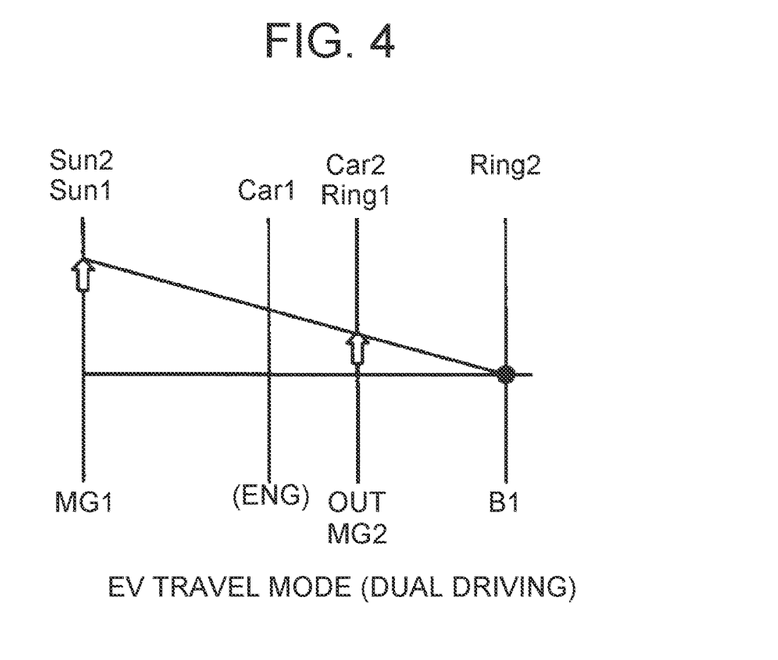
FIG. 4 is an alignment chart in a dual-motor travel mode.
Figure 5:
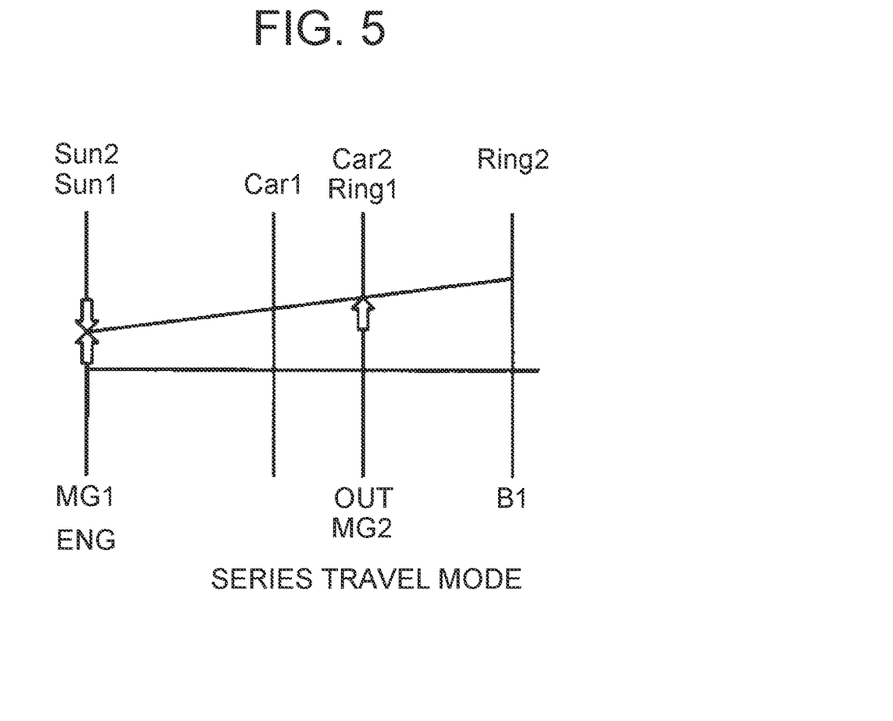
FIG. 5 is an alignment chart in a series travel mode.
Figure 6:
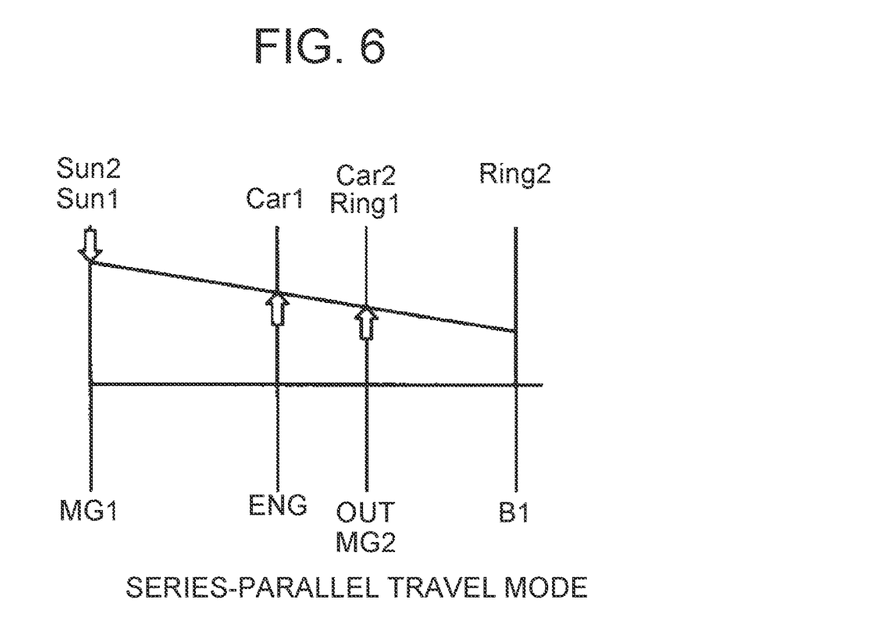
FIG. 6 is an alignment chart in a series parallel travel mode.

FIG. 3 is an alignment chart in the MG2 single travel mode. FIG. 4 is an alignment chart in the dual-motor travel mode. FIG. 5 is an alignment chart in the series travel mode. FIG. 6 is an alignment chart in the series-parallel travel mode. FIGS. 7 to 10 are alignment charts in the parallel travel mode.

IN FIGS. 3 to 10, "Sun1", "Sun2", "Car1", "Car2", "Ring1", "Ring2", "ENG", "MG1", "MG2", and "B1" represent the sun gear S1, the sun gear S2, the carrier CA1, the carrier CA2, the ring gear R1, the ring gear R2, the engine 10, the first MG 20, the second MG 30, and the brake B1, respectively.

With reference to FIG. 3, the control state during the MG2 single travel mode will be described. As illustrated in Table 1, in the MG2 single travel mode, the control unit 100 engages the clutch C1, and disengages the clutch C2 and the brake B1. The control unit 100 also stops the engine 10, and operates the second MG2 as a motor. A second MG torque Tm2 is transmitted to the driving wheels 90 through components such as the rotating shaft 31, the reduction gear 32, and the driven gear 71. In this case, since the clutch C1 is engaged, the crankshaft 21 and the rotating shaft 22 are coupled by the clutch C1. Since the engine 10 is stopped, the crankshaft 21 does not rotate, and the rotating shaft 22 coupled with the crankshaft 21 does not rotate either. Accordingly, the sun gears S1, S2 do not rotate.

Meanwhile, since the clutch C2 and the brake B1 are disengaged, rotation of the ring gear R2 and the carrier CA2 is not restricted, and therefore the ring gear R2 and the carrier CA2 idly rotate with the rotation of the ring gear R1.

Thus, in the MG2 single travel mode, the vehicle 1 travels using the torque (hereinafter referred to as a second MG torque Tm2) from the second MG 30.

A description is now given of the control state in the dual-motor travel mode with reference to FIG. 4. In the dual-motor travel mode, as illustrated in Table 1, the control unit 100 disengages the clutch C1 and the clutch C2, and engages the brake B1.

Since the clutches C1, C2 are disengaged, the engine 10 is in a state of being separated from the first planetary gear drive 40. Since the brake B1 is engaged, the ring gear R2 is fixed to a casing 25, so that the rotational speed of the ring gear R2 becomes zero.

Then, the first MG 20 and the second MG 30 operate as a motor. Since rotation of the ring gear R2 is restricted, the torque (hereinafter referred to as a first MG torque Tm1) from the first MG 20 is transmitted to the driven gear 71 through the sun gears S2, S1 and the ring gear R1. Furthermore, the second MG torque Tm2 from the second MG 30 is also transmitted to the driven gear 71. Thus, the first MG torque Tm1 is added to the second MG torque Tm2 from the second MG 30, and is transmitted to the driving wheels 90.

The control unit 100 regulates a share ratio of the first MG torque Tm1 and the second MG torque Tm2 so as to satisfy the request torque from the user.

With reference to FIG. 5, the control state in the series travel mode will be described. In the series travel mode, as illustrated in Table 1, the control unit 100 engages the clutch C1, and disengages the clutch C2 and the brake B1.

Since the clutch C1 is engaged, the rotating shaft 22 and the crankshaft 21 are coupled. Since the clutch C2 and the brake B1 are disengaged, the carrier CA1 and the ring gear R2 become rotatable.

Then, the engine 10 and the second MG 30 are driven. When the engine 10 is driven, the torque (hereinafter referred to as an engine torque Te) of the engine 10 is transmitted to the rotating shaft 22 through the clutch C1, and the first MG 20 generates electric power.

The second MG 30 operates as a motor using all or some of the electric power generated in the first MG 20. Then, the vehicle 1 travels with the second MG torque Tm2 from the second MG 30.

With reference to FIG. 6, the control state in the series-parallel travel mode will be described. As illustrated in Table 1, in the series-parallel travel mode, the clutch C1 and the brake B1 are disengaged, and the clutch C2 is engaged.

Since the clutch C2 is engaged, the crankshaft 21 and the carrier CA1 are coupled. In this state, the control unit 100 drives the engine 10 and the second MG 30.

The engine torque Te from the engine 10 is transmitted to the carrier CA1. The first MG 20 functions as a generator. The first MG torque Tm1 is used as reaction force for transmitting the engine torque Te to the ring gear R1.

The engine torque Te (hereinafter referred to as an engine transmitting torque Tec) transmitted to the ring gear R1 is transmitted to the counter shaft 70 from the driven gear 71, and acts as the motive power for driving the vehicle 1.

In the series-parallel travel mode, the control unit 100 operates the second MG 30 mainly as a motor. The second MG torque Tm2 is transmitted to the driving wheels 90 through the components such as the reduction gear 32, the driven gear 71, and the counter shaft 70.

Thus, in the series-parallel travel mode, the vehicle 1 travels using the engine transmitting torque Tec and the second MG torque Tm2.

A description is now given of the control state in the parallel travel mode. The parallel travel mode includes first speed to fourth speed.

Figure 7:
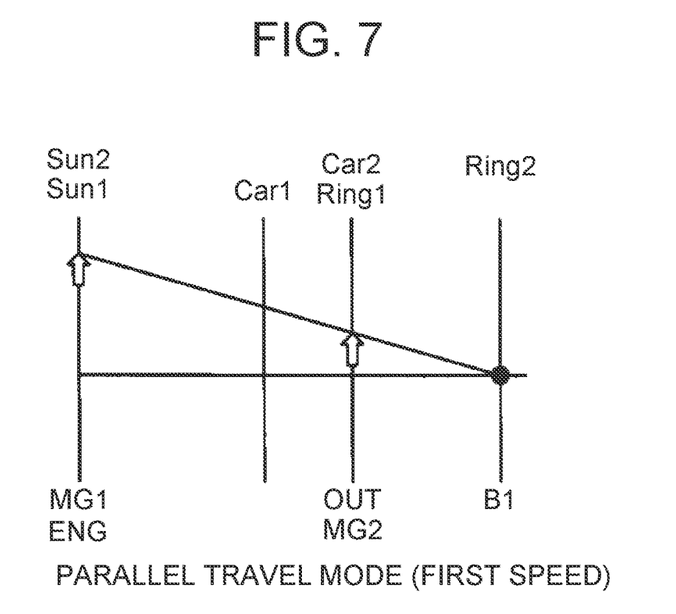
FIG. 7 is an alignment chart in a parallel travel mode (first speed)

With reference to FIG. 7, the control state at the time of formation of the first speed will be described. As illustrated in Table 1, the control unit 100 engages the clutch C1 and the brake B1, and disengages the clutch C2. Since the clutch C1 is engaged, the crankshaft 21 and the rotating shaft 22 are joined through the clutch C1. Furthermore, since the brake B1 is engaged, the ring gear R2 is fixed to the casing 25, so that the rotational speed of the ring gear R2 becomes zero.

Then, the control unit 100 operates the engine 10. When a high driving force is requested, the first MG 20, the second MG 30, or both the MGs are further operated as a motor.

Since the rotating shaft 22 and the crankshaft 21 are joined to each other, the speed of the rotating shaft 22 is in accord with the speed of the crankshaft 21. The first MG torque Tm1 and the engine torque Te are transmitted to the driven gear 71 from the ring gear R1. Furthermore, the second MG torque Tm2 from the second MG 30 is also transmitted to the driven gear 71.

Figure 8:
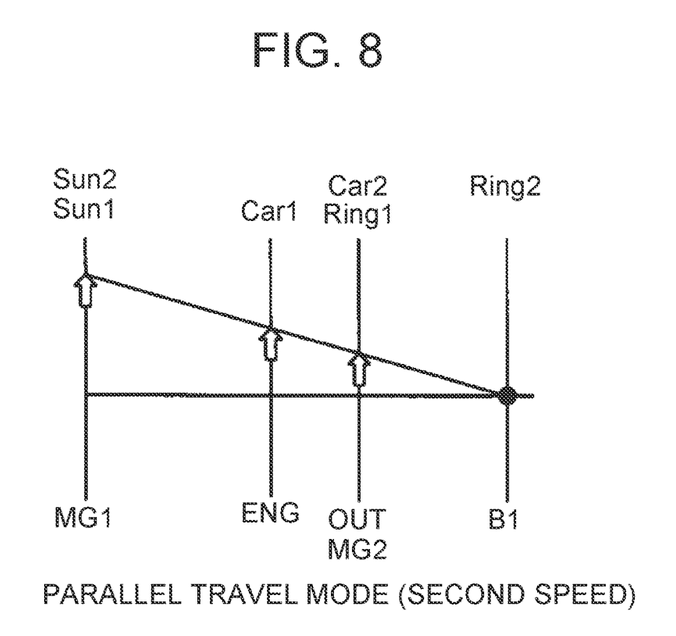
FIG. 8 is an alignment chart in the parallel travel mode (second speed)

With reference to FIG. 8, the control state at the time of formation of the second speed will be described. As illustrated in Table 1, the control unit 100 disengages the clutch C1, and engages the clutch C2 and the brake B1.

Accordingly, the crankshaft 21 is coupled with the carrier CA1 through the clutch C2. Furthermore, the ring gear R2 is fixed to the casing 25 by the brake B1 being engaged.

Then, the control unit 100 operates the engine 10. When a high driving force is requested, the first MG 20, the second MG 30, or both the MGs are further operated as a motor.

The engine torque Te from the engine 10 is transmitted to the ring gear R1 from the carrier CA1. The first MG torque Tm1 is also transmitted to the ring gear R1 through the sun gears S1, S2. The first MG torque Tm1 is then transmitted from the ring gear R1 to the driving wheels 90 through the driven gear 71 and the like. The second MG torque Tm2 is also transmitted to the driving wheels 90 through the reduction gear 32 and the like.

Here, in the state illustrated in FIG. 7, the crankshaft 21 is coupled with the sun gear S1, while in the state illustrated in FIG. 8, the crankshaft 21 is coupled with the carrier CA1. Accordingly, a gear reduction ratio between the speed of the engine 10 and the speed of the ring gear R1 is smaller in the state illustrated in FIG. 8. This indicates that the state illustrated in FIG. 8 is higher in speed stage than the state illustrated in FIG. 7.

Figure 9:
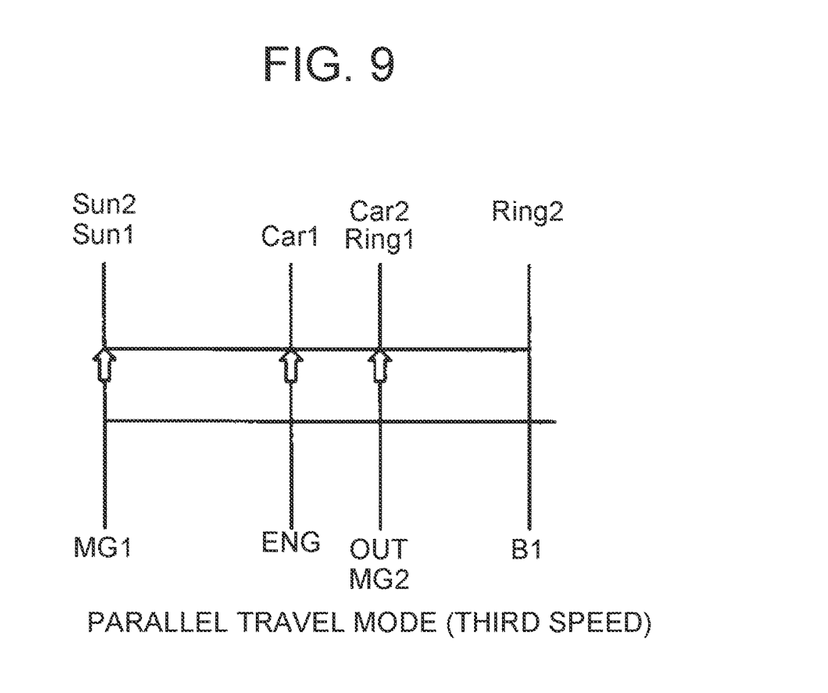
FIG. 9 is an alignment chart in the parallel travel mode (third speed)

With reference to FIG. 9, the control state at the time of formation of the third speed will be described. As illustrated in Table 1, the control unit 100 engages the clutch C1 and the clutch C2, and disengages the brake B1. Accordingly, each of the sun gears S1, S2 and the carrier CA1 is coupled with the crankshaft 21. Since the carrier CA2 is coupled with the ring gear R1, the sun gear S1, the carrier CA1, the ring gear R1, the sun gear S2, the carrier CA2, and the ring gear R2 rotate at the same rotational speed. The control unit 100 operates the engine 10. When a high driving force is requested, the first MG 20, the second MG 30, or both the MGs are further operated as a motor.

Then, the engine torque Te and the first MG torque Tm1 are transmitted to the ring gear R1, and transmitted to the driven gear 71. The second MG torque Tm2 is also transmitted to the driven gear 71 through the reduction gear 32. The vehicle 1 travels with the first MG torque Tm1, the second MG torque Tm2, and the engine torque Te.

Here, in the state illustrated in FIG. 9, the gear reduction ratio is one, whereas in the state illustrated in FIG. 8, the gear reduction ratio is larger than one. This indicates that the state illustrated in FIG. 9 is higher in speed stage than the state illustrated in FIG. 8.

Figure 10:
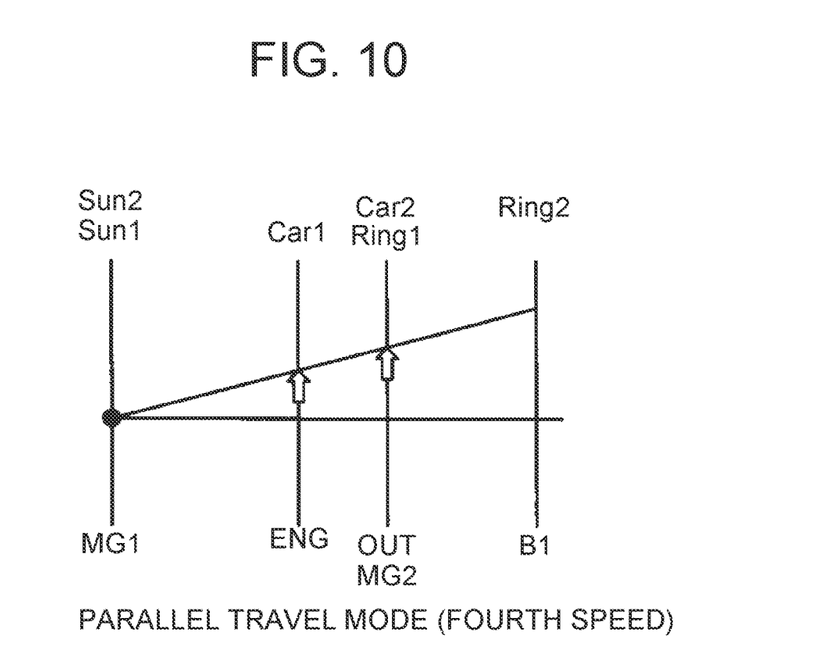
FIG. 10 is an alignment chart in a parallel travel mode (fourth speed).

With reference to FIG. 10, the control state at the time of formation of the fourth speed will be described. As illustrated in Table 1, the control unit 100 disengages the clutch C1 and the brake B1, and engages the clutch C2. Since the clutch C2 is engaged, the crankshaft 21 and the carrier CA1 are coupled through the clutch C2.

The control unit 100 controls the speed of the first MG 20 so that the rotational speed of the sun gear S1 and the sun gear S2 becomes zero ("electric lock" in Table 1).

To set the speed of the sun gears S1, S2 to zero by using the first MG 20, the current of the first MG 20 is feedback-controlled so that the rotational speed of the first MG 20 becomes zero, for example.

Then, the control unit 100 drives the second MG 30 and the engine 10.

The engine torque Te of the engine 10 is transmitted to the ring gear R. 1 through the carrier CA1, and transmitted to the driving wheels 90. The second MG torque Tm2 is also transmitted to the driving wheels 90.

As is clear from FIG. 10, in the state illustrated in FIG. 10, the gear reduction ratio is smaller than one, and a speed stage higher than that in the state illustrated in FIG. 9 is formed.

Here, in the series travel mode, the vehicle travels with only the second MG torque Tm2, whereas in the series-parallel travel mode, the vehicle 1 travels with the second MG torque Tm2 and the engine transmitting torque Tec. Accordingly, the series-parallel travel mode is higher in capable of outputting driving force than the series travel mode.

Accordingly, when the control unit 100 determines during traveling in the series travel mode that the driving force requested to the vehicle speed from the user is too large to supply in the series travel mode, the control unit 100 switches the travel mode to the series-parallel travel mode.

When the vehicle 1 according to the present embodiment makes a backward movement, the series travel mode is selected. In the series travel mode, the torque from the engine 10 is prevented from being transmitted to the counter shaft 70. Accordingly, when the second MG 30 negatively rotates to cause negative rotation of the driven gear 71, the second MG 30 is prevented from receiving the torque in a positive rotation direction from the engine 10. In the series-parallel travel mode, when the vehicle 1 makes a backward movement, a direct torque of the positive rotation is added from the engine 10 to the driven gear 71. As a result, the second MG 30 needs to generate a large second MG torque Tm2 for backward movement of the vehicle 1.

In the series-parallel travel mode, the first MG 20 functions as a generator, whereas in the parallel travel mode, the first MG 20 functions as a motor. Accordingly, the driving force that can be output in the parallel travel mode is higher than the driving force that can be output in the series-parallel travel mode.

Accordingly, when the vehicle is unable to supply the driving force requested from the user in the series-parallel travel mode, the control unit 100 selects the parallel travel mode. Generally, the two MGs (rotary electric machines) each have an ability to output the motive power close to the engine power. However, in the series travel mode or the series-parallel travel mode, the two MGs (rotary electric machines) have a disadvantage that full use of the MGs (rotary electric machines) as a power source is not available since the MGs function as transmissions of the engine power. At the same time, the vehicle according to the present embodiment is capable of outputting the sum of the driving force of the engine 10, the driving force of the first MG 20, and the driving force of the second MG 30.

Specifically, the parallel travel mode in the mechanism illustrated in FIG. 1 enables the vehicle to travel in the first to third speeds with only the engine 10 and without any of the first MG 20 and second MG 30. When a large driving force is desired to be output, the vehicle can travel with the motive power of the first MG 20 and the second MG 30 being fully added to the engine power.

In the vehicle 1 according to the present embodiment, the first speed to fourth speed can be switched in the parallel travel mode. Therefore, at the time of climbing or acceleration, the first speed to the third speed can be used. In the series-parallel travel mode, high efficiency can be achieved even at the timing when energy efficiency deteriorates. Furthermore, adopting the fourth speed during high-speed traveling makes it possible to implement traveling with good energy efficiency even at the time of high speed.

As described in the foregoing, the drive unit 2 according to the present embodiment can select the EV travel mode, the series travel mode, the series-parallel travel mode, and the parallel travel mode.

Furthermore, the drive unit 2 is formed from two single pinion planetary gear drives, the clutches C1, C2 and the brake B1. Therefore, reduction in the number of parts count and suppression of complicated configuration are also achieved.

It should be understood that the embodiment disclosed is in all respects illustrative and are not considered as the basis for restrictive interpretation. The scope of the present disclosure is defined not by the foregoing description but by the range of appended claim. All changes which come within the range of the claim and meaning and the range of equivalency thereof are therefore intended to be embraced therein.

The present disclosure is applicable to drive units.

What is claimed is:

1. A drive unit, comprising:
   a driving shaft connected to driving wheels;
   an engine;
   a first rotary electric machine;
   a second rotary electric machine mechanically connected to the driving shaft;
   a first planetary gear drive including a first ring gear, a first pinion gear, a first carrier connected to the first pinion gear, and a first sun gear;
   a second planetary gear drive including a second ring gear, a second pinion gear, a second carrier connected to the second pinion gear, and a second sun gear;
   a first clutch;
   a second clutch; and
   a brake,
      the first ring gear being connected to the second carrier, the first ring gear being mechanically connected to the driving shaft,
      the first sun gear being connected to the second sun gear and the first rotary electric machine,
      the first clutch being configured to selectively switch a connection state of the first sun gear and the engine between a connected state and a disconnected state,
      the second clutch being configured to selectively switch a connection state of the first carrier and the engine between a connected state and a disconnected state, and
      the brake being configured to selectively switch a fixation state of the second ring gear and a fixing member between a fixed state and a released state.

2. The drive unit of claim 1 further comprising a hydraulic circuit operatively connected to the first clutch, the second clutch, and the brake, the hydraulic circuit configured to switch the connection state of the first clutch, the connection state of the second clutch, and the fixation state of the brake.

3. The drive unit of claim 2 further comprising an electronic control unit operatively connected to the hydraulic circuit, the electronic control unit configured to control the hydraulic circuit to switch the connection state of the first clutch, the connection state of the second clutch, and the fixation state of the brake.

4. The drive unit of claim 3, wherein the electronic control unit controls the hydraulic circuit to operate in one of a motor travel mode or a hybrid travel mode.

5. The drive unit of claim 4, wherein in the motor travel mode motive power is output to the driving wheels from at least one of the first rotary electric machine and the second rotary electric machine and in which the engine is stopped.

6. The drive unit of claim 4, wherein in the hybrid travel mode motive power is output to the driving wheels from the engine and the first rotary electric machine or from the engine and the second rotary electric machine.

* * * * *